May 25, 1926.
F. A. GROVES ET AL
1,585,976
FLUID GAUGE
Filed March 2, 1922 2 Sheets-Sheet 1
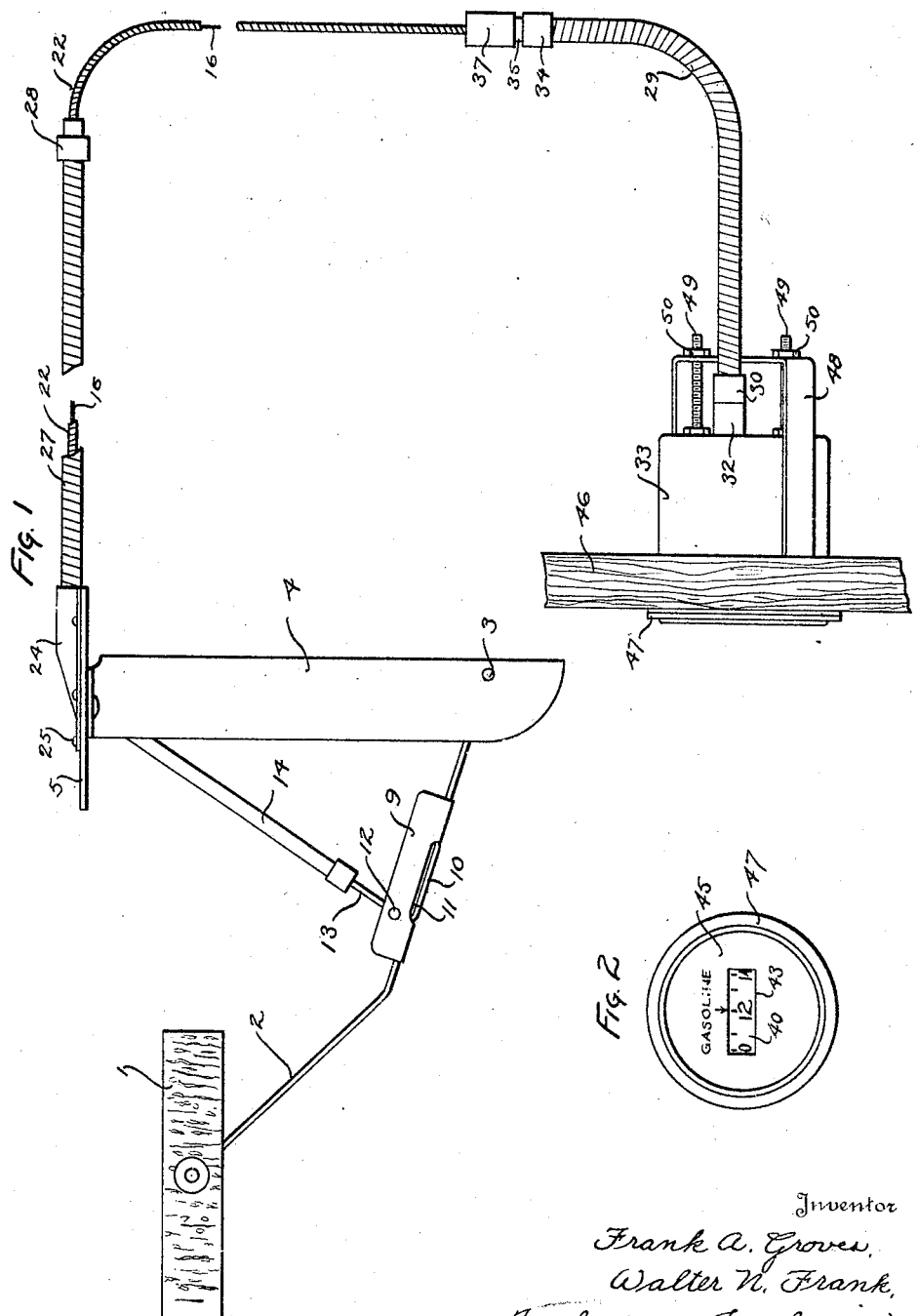
Inventor
Frank A. Groves,
Walter N. Frank,
By Toulmin & Toulmin
Attorney

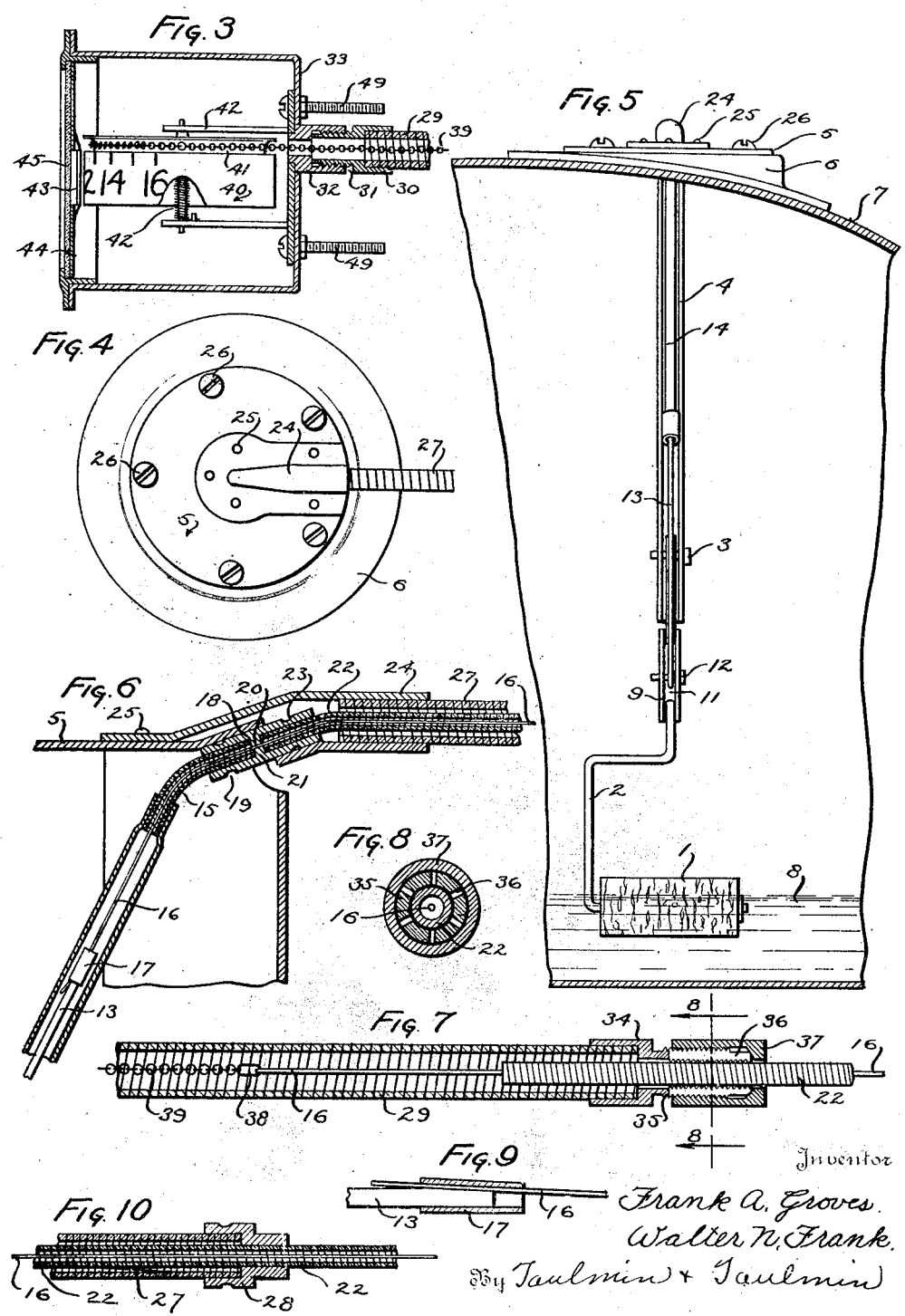

Patented May 25, 1926.

1,585,976

UNITED STATES PATENT OFFICE.

FRANK A. GROVES AND WALTER N. FRANK, OF DAYTON, OHIO, ASSIGNORS TO THE STEMCO ENGINEERING COMPANY, OF DAYTON, OHIO, A CORPORATION OF OHIO.

FLUID GAUGE.

Application filed March 2, 1922. Serial No. 540,521.

Our invention relates to gauges and in particular to fluid gauges for indicating the quantity or height of fluid in a receptacle.

The object of our invention is to provide a means of indicating the height or quantity of fluid in a tank remote from the point of indication. It is our object to provide a communicating means between the actuator and the indicator which will be flexible, durable and easily handled and easily installed. It is our object to provide a means of protecting this member so that it may freely operate and not be hindered by any accumulations of oil, dust or foreign material upon it or adjacent to it. It is a further object to provide means of adjusting the exact length of this element so that proper registration will be made upon the indicator of the movement of the actuator.

It is a further object of our invention to provide means of properly guiding the communicating means into and out of the tank without the exit of fluid from the tank with the minimum of bending or flexing of the communicating means and without the delivery by pumping or capillary attraction of the fluid along its communicating means as it passes into and out of said tank, depending upon the movement of the float or the float arm of the actuator. It is a further object of our invention to provide a means of installing in tanks our actuator and of exactly locating the position thereof as may be predetermined so that a mechanic or operator of modest experience may be able to install the equipment without error.

It is a further object of our invention to provide a suitable means of connection between the communicating means and the indicator.

It is a further object to provide a means of positively locking the communicating means to the actuator arm in such a way that the connection will not result in the breaking of the communicating means by bending, flexing or twisting, but will positively actuate the communicating means.

Referring to the drawings:

Fig. 1 is an elevation of the complete assembly of actuator communicating means, protecting housing and indicator;

Fig. 2 is a front elevation of the indicator face;

Fig. 3 is a section of the indicator;

Fig. 4 is a plan view of the exterior of the actuator;

Fig. 5 is an end elevation of the actuator as installed in the tank with the tank in section;

Fig. 6 is a section of the upper portion of the actuator;

Fig. 7 is a section of the housing showing the connection of the outer housing to the inner housing adjacent the communicating means near the indicator;

Fig. 8 is a section on the line 8—8 of Fig. 7;

Fig. 9 is a section showing the connection between the communicating means or wire and the actuator rod;

Fig. 10 is a section of the housings and the communicating means between the housings near the actuator.

Referring to the drawings, 1 is a float carried on a float arm 2 which is pivoted at 3 to an actuator suspension member 4 that in turn is carried by a plate 5 which is mounted upon a cap 6 which surrounds the opening in the tank top 7. The float 1 is adapted to ride on the fluid 8 within the tank.

A clip 9 is clamped upon the float arm 2 and is prevented from shifting laterally because of the kicked-up portion 10 being projected through a cutaway portion 11 in 9. To 9 is pivoted at 12 a rod 13 which travels back and forth in a tubular member 14 which is suspended upon the free end of a flexible casing 15. Within 15 travels the actuating wire 16 that is connected to 13 by having a sleeve 17 driven over the end of 13 and embracing the wire 16 between it and the end of 13. This makes such a connection that the wire will not be twisted or bent and therefore will not be readily broken. The flexible member 15 is contained in a tubular member 18 by being crimped therein as indicated at 19. The wire 16 passes through a minute passage way 20 which is formed in a wall 21 that divides the interior of 18 into two compartments. The other compartment contains a similar flexible member as 22 which is also crimped therein as indicated at 23. 18 is supported in the plate 5 on one side and the tubular cap member 24 at the other side. 24 is fastened to 5 by a series of rivets 25, while 5 is attached to 6 by the screws 26.

Within the tubular portion of 24, 22 passes and is spaced therefrom. It will be also observed that the wire 16 is spaced from 22. Carried at the outer end of 24, but spaced from 22, is a second flexible spiral casing wound in the opposite direction from the winding of 22. This casing is designated 27. It travels a portion of the length of 22 and terminates in a collar 28 which is crimped upon 27. This outer casing 27 serves to protect the casing 22 where it is most exposed in its passage from the tank to a point beneath the frame of an automobile where the equipment is installed in an automobile.

A similar protecting outer casing is installed at the forward end of the equipment where, as in an automobile, it is more likely to be damaged.

This casing is designated 29. It has a collar 30 at one end with a threaded projection 31 which is threaded into a companion collar 32 carried by the casing 33 of the indicator. 30, therefore, supports 29 at one end and at the other end it carries a collar 34 which has an internally and externally threaded portion 35 having slots 36 cut therein. The casing 22 passes freely within 35 and 34 but adjacent thereto. An internally threaded sleeve 37 is adapted to be threaded upon 36 and by collapsing 36 engage the threads on the interior thereof with the spiral groove on the exterior of 22, thus definitely fixing 29 with respect to 22. The wire 16 at the actuator end terminates in a link 38 connected to a chain 39. The chain is used because of the fact that it must be constantly flexed as it passes around the drum of the dial 40 in the groove 41. This dial is supported in a bracket 42 carried by the housing 33. Suitable numerals appear on the face of the dial. The dial is moved against the tension of a spring 42 which constantly tends to keep the wire and chain taut. An opening 43 is provided in the dial face 44 beneath the glass 45. Through this opening the figures on the drum 40 are displayed.

The indicator is retained on the dashboard 46 by having the rear of the flange 47 on its face embrace one side of the dashboard 46 and the other side embraced by the U-shaped clamp 48 which is retained on the housing 33 by the bolts 49 and nuts 50.

Having thus fully described our invention, what we claim as new and desire to secure by Letters Patent, is:—

1. In combination, an actuator, consisting of means to support a float, a float arm, means connected therewith to actuate a communicating means consisting of a flexible member, means to guide the actuating means, means to guide the communicating means, means to indicate the degree of actuation of the communicating means, a second guiding means surrounding the first guiding means of the communicating means, and means of attaching and detaching said second means with respect to the first means.

2. In an actuator, a supporting means, a float and float arm pivoted thereto, a guiding means pivoted at the upper end thereof to a flexible casing, a flexible casing, a rod connected to said float arm traveling within said guiding means, a flexible communicating means passing through said casing and guiding means connected to said rod at one end and at the other end to an indicator, whereby as the float rises and falls the communicating means will be actuated.

3. In an actuator, a supporting means, a float and float arm pivoted thereto, a guiding means pivoted at the upper end thereof to a flexible casing, a flexible casing, a rod connected to said float arm traveling within said guiding means, a flexible communicating means passing through said casing and guiding means connected to said rod at one end and at the other end to an indicator, a second flexible casing for the communicating means, said flexible casing being held in a single retaining means with their ends spaced from one another by said retaining means, a minute communicating passage way therebetween through which said communicating means passes, whereby as the float rises and falls the communicating means will be actuated.

4. In an actuator, a supporting means, a float and float arm pivoted thereto, a guiding means pivoted at the upper end thereof to a flexible casing, a flexible casing, a rod connected to said float arm traveling within said guiding means, a flexible communicating means passing through said casing and guiding means connected to said rod at one end and at the other end to an indicator, a second flexible casing for the communicating means, said flexible casing being held in a single retaining means with their ends spaced from one another by said retaining means, a minute communicating passage way therebetween through which said communicating means passes, a flexible casing spaced from and surrounding the second casing for the communicating means, means to positively support said casing at one end connected to the actuator, means to attach said casing to the second mentioned casing at its other end, whereby as the float rises and falls the communicating means will be actuated.

5. In an actuator, a supporting means, a float and float arm pivoted thereto, a guiding means pivoted at the upper end thereof to a flexible casing, a flexible casing, a rod connected to said float arm traveling within said guiding means, a flexible communicating means passing through said casing and guiding means connected to said rod at one end and at the other end to an indicator, a second flexible casing for the communicating means, said flexible casing being held in a single retaining means with their ends spaced from one another by said retaining means, a minute communicating passage way therebetween through which said communicating means passes, a flexible casing spaced from and surrounding the second casing for the communicating means, means to positively support said casing at one end connected to the actuator, means to attach said casing to the second mentioned casing at its other end, another similar exterior casing attached to the indicator at one end and adapted to be clamped to the second casing at varying positions but having its clamping end spaced from the end of the other outside casing, whereby as the float rises and falls the communicating means will be actuated.

6. In combination, a tubular guide member, a rod working therein, a wire connected to said rod at the end thereof by a driving fit of a sleeve engaging the end of the wire and the end of the rod, a flexible guiding member connected to said rod through which said wire passes, means to support said flexible guiding member crimped thereon, a wall at the end of said supporting means having a minute aperture therethrough for the passage of the wire into a second flexible guiding member supported by said supporting means which is crimped in said supporting means, a bracket supporting said supporting means having a tubular extension, a flexible casing carried by one end of said tubular extension surrounding the flexible guiding means for the wire and spaced therefrom to protect it, whereby the wire may be moved through said guiding and protecting means freely without liquids being induced by capillary attraction to pass along the wire and the tubular passageways beyond the barrier in the supporting means.

7. In combination, a plate having staggered holes therein adapted to receive bolts for the attachment thereto of an actuator plate, an actuator plate, an actuator supporting member attached to the bottom thereof projecting into the tank, a tubular cap member attached to the top thereof to support a casing member, a float and float arm pivoted at the lower end of said supporting actuator member, a rod pivoted on said float arm at one end and connected at the other end to an actuating wire projecting through the tubular cap member and the plate, a tubular guide member in which said rod passes, together with the wire, the upper end of said tubular member being connected to a flexible member having one end carried in said plate, a second flexible member surrounding said wire in the tubular cap member, and means between said members to permit of the free passage of wire but to prevent the passage of liquid therethrough, whereby when the float is actuated the wire may be moved freely to indicate the state of the liquid in the tank.

8. In a tank fitting, a plate having an aperture and also having a series of holes spaced in the surface thereof about the margin of said aperture therein at unequal distances from one another, a cap plate adapted to be mounted thereon to close the aperture therein and having a series of corresponding apertures corresponding to the holes in the first mentioned plate, said cap plate carrying a series of attaching members to be inserted in the holes in the first mentioned plate, whereby the exact positioning of one plate to the other will always be secured, said second plate having an aperture and a cap adapted to be attached thereto with a tubular projection to support a guide and tubular member extending into the tank.

9. In combination in a coupling, a sleeve having a tubular head with internal and external threads said sleeve being so formed to permit of its being partially collapsed and a collar adapted to be threaded on the exterior of said head to collapse it whereby a member within said head may be clamped in position by the edges of the threads therein.

10. In combination in a coupling, a sleeve having a tubular head with internal and external threads said sleeve being so formed to permit of its being partially collapsed and a collar adapted to be threaded on the exterior of said head to collapse it whereby a member within said head may be clamped in position by the edges of the threads therein, said member, last mentioned, consisting of a spirallly wound flexible body in the grooves on which the threads on the interior of the head are adapted to fit.

11. In combination in a coupling, a sleeve having a tubular head with internal and external threads said sleeve being so formed to permit of its being partially collapsed and a collar adapted to be threaded on the exterior of said head to collapse it whereby a member within said head may be clamped in position by the edges of the threads therein, said member last mentioned consisting of a spirally wound flexible body in the grooves on which the threads on the interior of the head are adapted to fit, a flexible member adapted to pass freely through the last mentioned member and the supporting head and its supporting member.

12. In combination in a coupling of a flexible supporting member, a head mounted thereon having a projecting tubular portion closely fitting and engaging a second flexible tubular member adapted to pass through the first member and to be spaced therefrom, and a second flexible tubular member.

13. In combination in a coupling of a flexible supporting member, a head mounted theron having a projecting tubular portion closely fitting and engaging a second flexible tubular member adapted to pass through the first member and to be spaced therefrom, a second flexible tubular member and an actuating member passing from the second member.

14. In a coupling, a rigid actuating member, a connecting member having its free end diagonally disposed to the major axis of the actuating member, said actuating member having a slightly tapered head and a conical sleeve engaging the free ends of said members to clamp them with one another.

15. In a coupling, a one piece tubular member having tubular chambers at either end separated by an interiorly disposed wall, and having a minute opening through said wall adapted to accommodate an actuating member passing therethrough.

16. In a coupling, a tubular member having tubular chambers at either end separated by an interiorly disposed wall, and having a minute opening through said wall adapted to accommodate an actuating member passing therethrough, a flexible member inserted in either of the tubular chambers and clamped thereto, said actuating means passing through said flexible members freely therein.

In testimony whereof, we affix our signatures.

FRANK A. GROVES.
WALTER N. FRANK.